Jan. 27, 1959  A. M. HILL  2,870,934
SCRAPER TRAP CLOSURE
Filed May 31, 1955  4 Sheets-Sheet 2

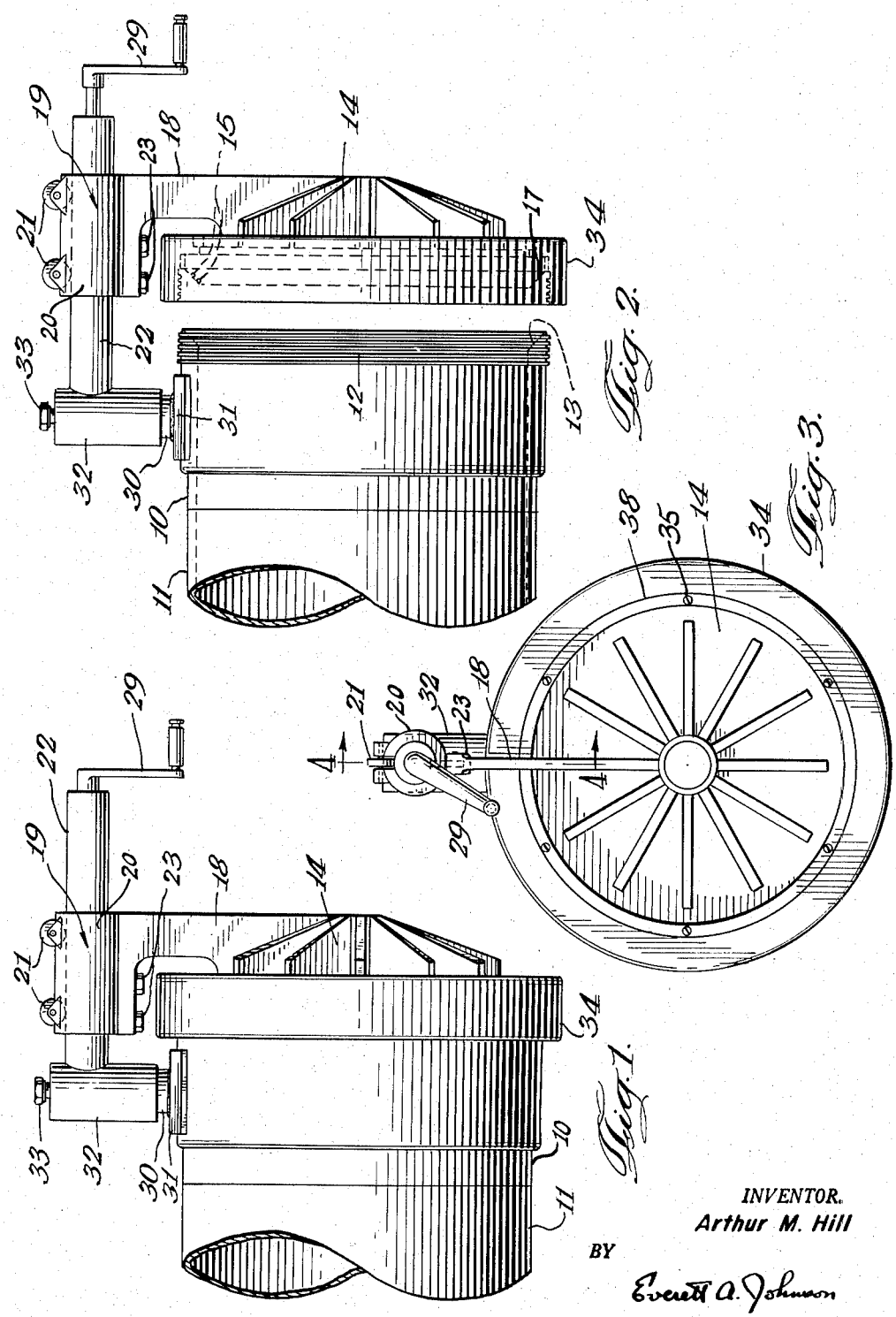

INVENTOR.
Arthur M. Hill
BY
Everett A. Johnson
attorney

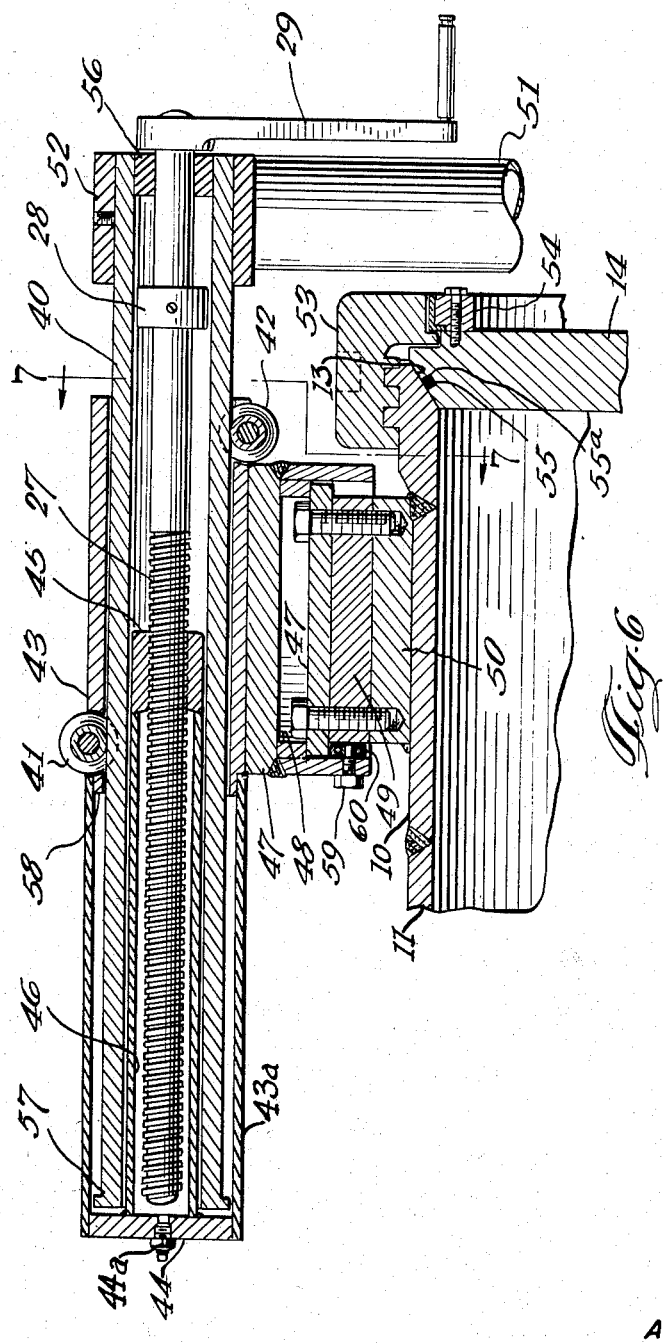

Jan. 27, 1959
A. M. HILL
2,870,934
SCRAPER TRAP CLOSURE
Filed May 31, 1955
4 Sheets-Sheet 4
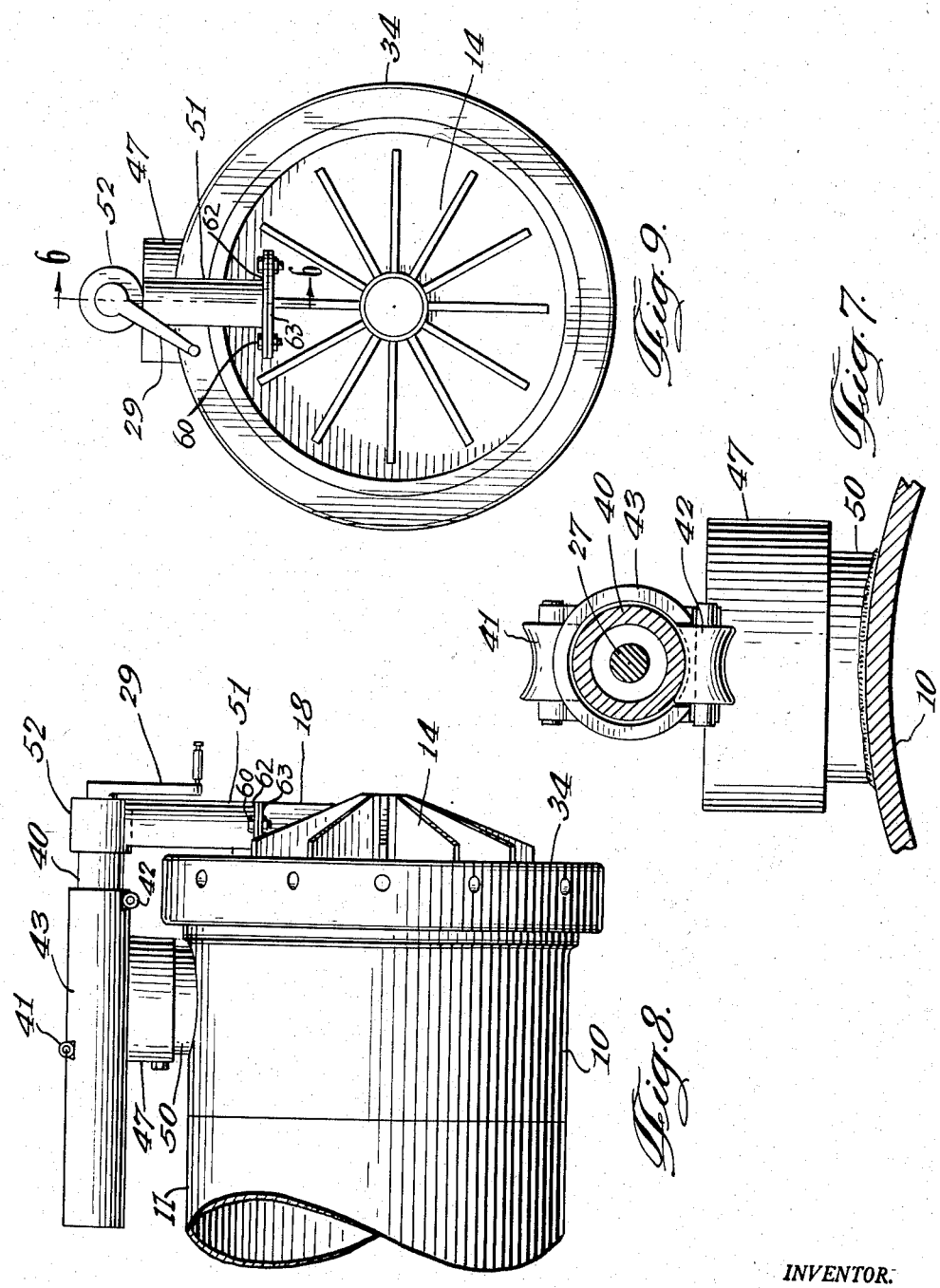
INVENTOR.
Arthur M. Hill
BY
Everett A. Johnson
attorney

United States Patent Office 2,870,934
Patented Jan. 27, 1959

---

2,870,934

SCRAPER TRAP CLOSURE

Arthur M. Hill, Tulsa, Okla., assignor to Service Pipe Line Company, Tulsa, Okla., a corporation of Maine Application May 31, 1955, Serial No. 512,011

7 Claims. (Cl. 220—33)

This invention relates to a pipe line fitting and, more particularly, to a closure for use on pipe line scraper barrels and scraper traps.

It is customary to scrape the interior of pipe lines by introducing a pig or scraper into one end of the line. A scraper barrel, or stub end of the line, receives and launches the pig or scraper and it is then propelled through the line by the flow of fluid therethrough.

The scraper is retrieved at points along the line for inspection and adjustment by catching the scraper in a trap which is a stub end of a pipe line which may be referred to as the scraper barrel. Frequently, it is slightly larger than the pipe itself and, in any event, is provided with a closure which is sealed against fluid pressure. Heretofore, the closures have been cumbersome and difficult to apply and to remove. Likewise, the removal of the scraper from a tilted scraper barrel has been difficult with prior art devices.

It is, therefore, an object of the invention to provide a closure for a pipe end or scraper barrel which closure is strong, light-weight, easy to handle and positively seals the pipe line. A further object is to provide a closure which facilitates insertion or removal of a pig or scraper from the trap. An additional object is to provide a scraper trap closure which does not require any hammering and bolting. Another object of the invention is to provide a closure having a seal ring embodied therein. Still another object of the invention is to provide a closure of this type wherein there is no rotation of the sealing surfaces when closing or opening the closure. A more specific object is to provide an apparatus for positively holding the cap and ring away from the scraper trap opening. A further object is to provide a closure which is adapted for use on tilted scraper traps. It is also an object of the invention to provide a durable closure which is simple in operation and which can be manipulated in large sizes by one man. These and other objects of the invention will become apparent as the description thereof proceeds.

In brief, the invention provides a quick-opening fitting which comprises a plug head having a beveled seat and O-ring gasket. The closure head is axially movable on an overhead arm and is swingable laterally about a pedestal to expose the full open end of the barrel to permit easy removal of the pig. The closure head assembly is movable by a hand crank and threaded shaft in the overhead arm; thus, when the seal ring is unscrewed from the body, a closure carriage is moved axially a distance greater than the radius of the end of the scraper trap whereupon the complete unit can be swung 90° about the pedestal for removal of the pipe line scraper.

To close the scraper trap, the head is swung back into position and a hand crank is operated to move the head and the threaded seal ring into position for engagement with threads on the body. To maintain proper alignment of the threads on the seal ring for the engagement with threads on the body, I provide for vertical adjustment of the arm. Such adjustment may be accomplished by any of several means, but one effective way is to employ a cap bolt which rests on the pedestal supporting the arm. Another means for effecting the adjustment is to provide a pair of support pads, the spacing of which is controlled by cap bolts.

Further details of the invention will be described by reference to a specific embodiment thereof which is illustrated in the accompanying drawings and wherein:

Figure 1 is a side elevation of the closure applied to a line;

Figure 2 is a side elevation showing the closure in an open position;

Figure 3 is a front elevation;

Figure 6 is a fragmentary elevation, partly in section, illustrating a second embodiment of my invention;

Figure 7 is a fragmentary section taken along the line 7—7 in Figure 6; and

Figures 8 and 9 are side and front elevations, respectively, of the embodiment of the invention illustrated in Figures 6 and 7.

Figure 5:
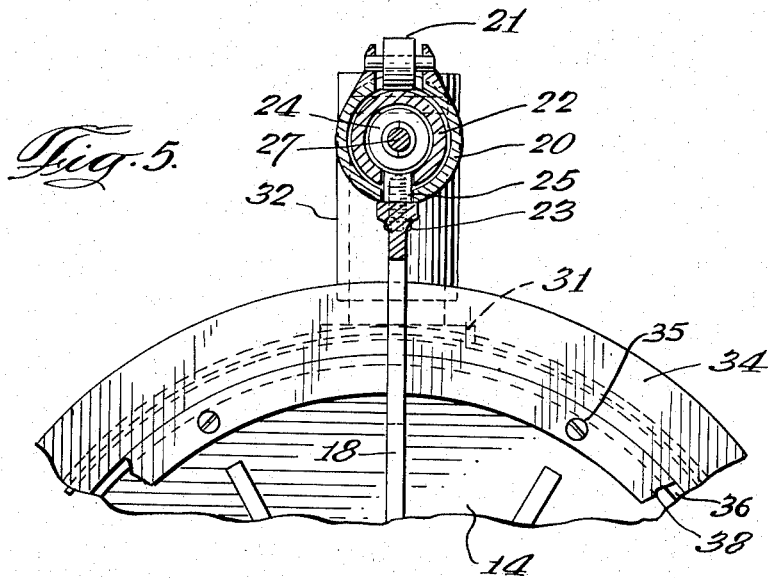
Figure 5 is a section taken along the line 5—5 in Figure 4.

Referring to the drawings, the closure body 10, welded to a pipe 11 in a conventional manner, is provided with external threads 12 and an internal beveled sealing surface 13. A closure head 14 is provided with an O-ring gasket means 15 on a beveled face 17 which is adapted to engage beveled surface 13 to make a fluid- and pressure-tight seal.

The closure head 14 is supported by the gusset 18 which, in turn, is fixed to the travelling carriage 19 carriage 19 comprising a tubular housing 20 which is supported by rollers 21 on the crane having a tubular arm 22. Bolts 23 fix the gusset 18 to the travelling nut 24 which has a depending rib 25 which is adapted to travel within the guide slot 26 in the tubular arm 22.

An extension screw, comprising a threaded shaft or worm and having thrust collar 28 disposed at a point spaced from the end thereof, is axially arranged within tubular arm 22 and in threaded engagement with the travelling nut 24. A hand crank 29 is fixed to the end of shaft 27 for rotating it within the tubular arm 22.

A pedestal 30 is welded to the plate 31 which is in turn welded to the top of the body 10. A cap 32, fixed to an end of the tubular arm 22, is rotatably supported by the pedestal 30 and a cap bolt 33 threaded into the cap 32 contacts the top of the pedestal 30 thereby providing for vertical adjustment of the closure with respect to the beveled seat 17 of the head 14 and the seat 13 of body 10.

The head 14 is held on the beveled seat 13 of the body 10 by means of threaded closure nut 34 which is rotatably retained on the head 14 by means of the thrust ring 38, Allen screws 35 holding the thrust ring 38 in the desired position to engage the thrust shoulder 36 on the nut 34. A facing 37 is interposed the inner peripheral face of the nut 34 and the outer peripheral face of the head 14. By this arrangement, the nut 34 is in sliding fit with the periphery of the head 14 for easy manipulation.

In operation, the nut 34 is turned off the body 10 and in so doing the nut 34 exerts a thrust against the retaining ring 38 carrying with it the head 14. This causes the carriage 19 and extension screw 27 to move axially of the tubular arm 22 via a lost motion linkage until the thrust collar 28 is brought into contact with the closed end 22a of the tubular arm 22.

Up to this point, the threaded shaft 27 and the travelling nut 24 have not moved relative to one another. However, turning of the hand-crank 29 will now cause the travelling carriage 19 to move axially of the tubular arm 22 within the guide slot 26, the weight of the head 14 being carried by the rollers 21 on the top of the tubular arm 22. This turning of the hand-crank, therefore, withdraws the arm 18 and with it the head 14 until it is possible to swing the arm 22 about the pedestal 30 to bring the head 14 around to the side of the body 10. This permits the quick and easy removal of a pipe line scraper (not shown) from the scraper barrel or pipe line section 11.

To replace the closure head 14, the tubular arm 22 is swung back 90° so that it is in substantial alignment with a vertical plane passing through the axis of the pipe 11 and body 10. The hand-crank 29 is then operated to move the head 14 and carriage 19 into position for engagement of the threads on closure nut 34 with the threads on the body 10. If necessary, cap bolt 33 can be turned to adjust the arm 18 vertically and to maintain proper alignment of the mating threads and of the bevelled seats 13 and 17 on the body 10 and closure 14.

Figure 4:
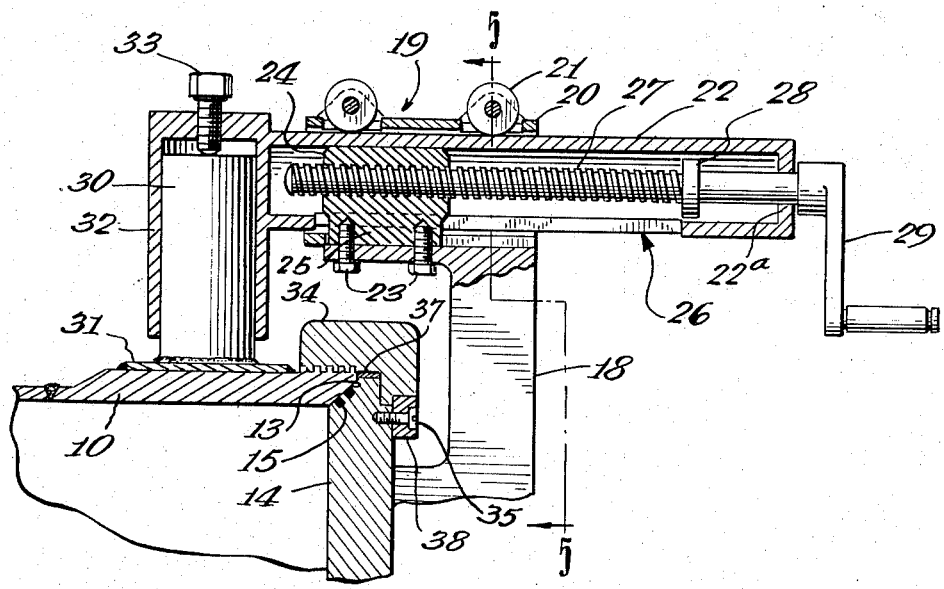
Figure 4 is a fragmentary section taken along the line 4—4 in Figure 3.

When the carriage 19 has travelled far enough to bring the threads into mating relation, the turning of the crank 29 is stopped. Then the nut 34 is turned to draw the gaskets 15 and the head 14 into fluid- and pressure-tight position thereby completing the closure. During the last operation, the extension screw 27 and thrust collar 28 move axially within the tubular arm 22 away from closed end 22a to the position shown in Figure 4.

In Figures 6 to 9, inclusive, another embodiment of the invention is illustrated which utilizes the principles described in connection with the apparatus shown in Figures 1 to 5. The extension screw 27 with its hand-crank 29 and screw stop 28 thereon is axially arranged within a slidable tubular extension arm 40, the closure head 14 being suspended by the head support 51 from the end of the arm 40. The arm 40 is supported on rollers 41 and 42 within the pivot head including the tubular arm 43 fixed to the cap 47 which encloses the annular swivel bearing 48 riding on pivot flange 49 fixed to the pivot or pedestal 50. The radial ball bearing 60 is retained by bolt 59 and makes contact with the bottom of cap 47 to counteract tilting of swivel bearing 48.

An extension nut assembly, within which the extension screw 27 telescopes, includes a threaded block 45 rigidly fixed by tube 46 to the end plate 44 disposed across the end of the tubular arm 43 of the pivot head.

The locking or closure nut 53 is secured to the head 14 by means of retaining ring 54. A rubber O-ring gasket 55 in groove 55a provides a fluid- and pressure-tight seal between the beveled face 17 of the head 14 and the beveled seat 13 on the body 10.

Referring to Figures 8 and 9, the vertical adjustment of closure head to threads 12 on body 10 is accomplished by the cap bolts 60 passing through the support pad 62 and the support plate 63. The support plate 63 is fixed to gusset 18 and is a rectangular plate having two drilled holes on the longitudinal center line and four tapped holes in the corners to accommodate Allen head set screws (not shown). The support plate 63 is carried by the head support 51 and is provided with two drilled and tapped holes for cap bolts 60. Space between support pad 62 and support plate 63 provides vertical adjustment of closure head 14 and may be fixed by tightening the Allen set screws. This arrangement permits alignment of the beveled face 17 of the head 14 with the seat 13 of the scraper barrel 10, both vertically and horizontally, with considerable accuracy under field conditions.

To operate the closure shown in Figures 6 to 9, inclusive, and described above, the handle 29 is turned until the extension screw 27 is moved outwardly of threaded block 45 to a point where the screws stop 28 fixed to screw 27 approaches the extension arm bushing 56. The nut 53 is then turned off the body 10 and in so doing the head 14 and extension arm 40 are moved outwardly of the pivot head and extension screw 27 until the bushing 56 approaches the handle 29.

The handle 29 may then again be rotated causing the extension screw 27 to move further out of the block 45 on the screw-jack principle which brings the screw stop 28 into contact with the extension arm bushing 56 which functions as a thrust ring thereby pushing the tubular extension arm 40 out of the arm 43 on spindle rollers 41 and 42 until the annular flange 57 on the free end of the extension arm 40 reaches the stop shoulder 58. This, of course, carries the head 14 away from the opening in the body 10 thereby enabling the operator to swing the pivot head and extension arm 40 about the pivot 50 on the circular swivel bearing 48. Thus, the fixed block 45 and the extension screw 27 cooperate to hold the extension arm 40 in an extended position even when the scraper trap body 10 is tilted at an angle to the horizontal. Accordingly, the jack screw principle illustrated in the drawings positively holds the head 14 and nut 53 in alignment to facilitate the opening and closing of the trap as well as positively holding the nut and head away from the end of the trap a sufficient distance so that it may be moved to the side of the opening.

From the above it will be apparent that a quick-opening and easy-operating closure has been provided for use in connection with scraper barrels and scraper traps. It is also contemplated, however, that a similar closure may be utilized for other purposes where it is desired to use a blanking plug in horizontally or vertically disposed positions, or on tilted line portions.

Although the invention has been described with reference to preferred embodiments thereof, it should be understood that this is by way of illustration only. In any event, other modifications and techniques will become apparent to those skilled in the art and can be made without departing from the spirit and scope of the invention.

What I claim is:

1. A support for an end closure of a substantially horizontally disposed pipe comprising a pedestal fixed to said pipe, the axis of said pedestal being substantially vertical and passing substantially through the axis of said pipe, crane means having an arm mounted to rotate on said pedestal, the axis of said arm being substantially parallel to the axis of said pipe, a carriage movably mounted to travel axially along said arm, a closure head for said pipe, and support means connecting said head to said carriage with the axis of said head substantially parallel to the axis of said arm.

2. An end closure support according to claim 1 including means to move said carriage along said arm.

3. An end closure support according to claim 2 including a nut connected with said carriage, a lead screw threaded into said nut and extending along said arm, and means to rotate said lead screw.

4. An end closure according to claim 3 including a lost motion linkage between said lead screw and said arm.

5. An end closure support according to claim 1 which includes means to adjust the axis of said head vertically.

6. A closure for a pipe end comprising a cylindrical body, external threads on said body, a beveled seat on said body adjacent said external threads, a closure head for said body, a beveled seat on said closure head adapted to mate with said beveled seat on said body, an O-ring gasket on one of said beveled seats, a supporting arm extending radially of said closure head, a carriage means supporting said arm, a crane arm supporting said carriage above said closure head, a screw drive means telescoping within said carriage and said crane arm, a threaded block fixed to said carriage means and in threaded engagement with said screw drive means, a locking nut rotatably carried by said closure head and adapted to engage said external threads on said body, a pedestal fixed to said body, a cap over said pedestal supporting said crane arm, swivel bearing means interposed said cap and said pedestal, roller means for supporting said carriage means on said crane arm, and a crank means for rotating said screw drive to position said carriage means with respect to said crane arm whereby said closure head may be moved axially of said body and swung about said pedestal to one side of said body.

7. An enclosure for a substantially horizontally disposed pipe comprising external threads on the end of said pipe, a pedestal fixed to said pipe, the axis of said pedestal being substantially vertical, crane means having an arm mounted to rotate on said pedestal, the axis of said arm being substantially parallel to the axis of said pipe, a carriage including a travelling nut mounted to travel along said arm, a closure head on said pipe, an internally threaded peripheral nut rotatably carried by said head, a thrust ring securing said nut to said head, a lead screw threaded into said travelling nut and mounted axially on said arm, means to rotate said lead screw, support means connecting said head to said carriage with the axis of said head substantially parallel to the axis of said arm, and a lost motion linkage between said lead screw and said arm whereby said peripheral nut may be made up on said pipe to seal said head against the end of said pipe without rotating said lead screw.

References Cited in the file of this patent

UNITED STATES PATENTS

| | | |
|---|---|---|
| 693,258 | Gibson | Feb. 11, 1902 |
| 1,090,883 | Schott | Mar. 24, 1914 |
| 1,465,906 | Holloway | Aug. 21, 1923 |
| 2,120,961 | Beede | June 21, 1938 |

UNITED STATES PATENT OFFICE
CERTIFICATE OF CORRECTION

Patent No. 2,870,934 January 27, 1959

Arthur M. Hill

It is hereby certified that error appears in the printed specification of the above numbered patent requiring correction and that the said Letters Patent should read as corrected below.

Column 2, line 34, after "travelling" strike out "carriage 19"; column 4, line 58, before "according" insert -- support --.

Signed and sealed this 12th day of May 1959.

(SEAL)
Attest:

KARL H. AXLINE
Attesting Officer

ROBERT C. WATSON
Commissioner of Patents